Figure 1:
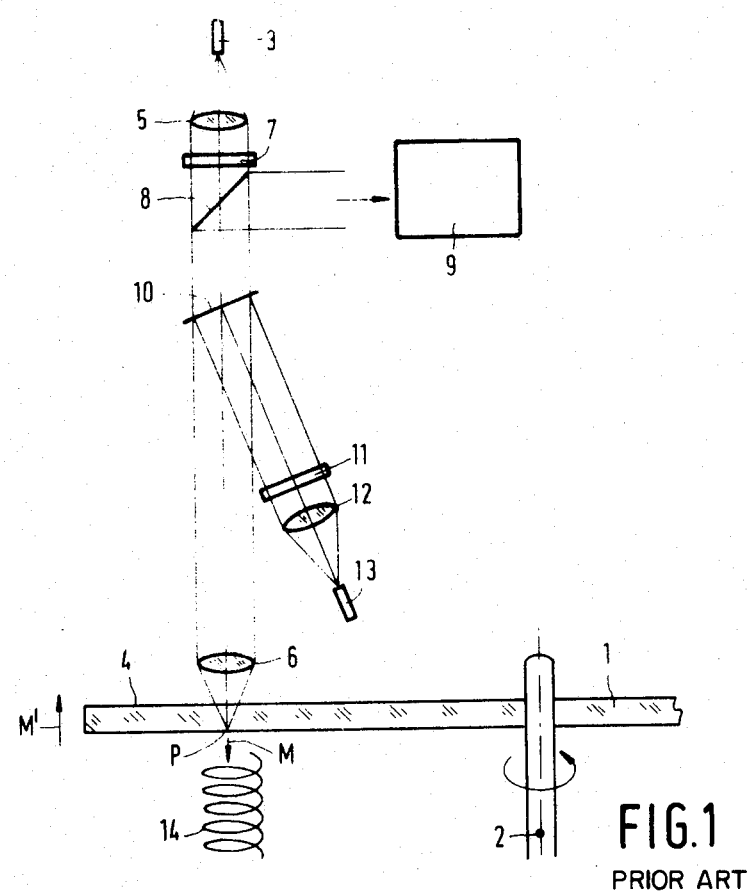

United States Patent [19]

Braat et al.

[11] Patent Number: 4,630,249
[45] Date of Patent: Dec. 16, 1986

[54] METHOD OF RECORDING INFORMATION IN A MAGNETO-OPTICAL RECORD CARRIER, APPARATUS FOR CARRYING OUT THE METHOD, AND MAGNETO-OPTICAL RECORD CARRIER FOR USE IN AN APPARATUS FOR CARRYING OUT THE METHOD

[75] Inventors: Josephus J. M. Braat; Marino G. Carasso, both of Eindhoven, Netherlands

[73] Assignee: U.S. Philips Corporation, New York, N.Y.

[21] Appl. No.: 562,342

[22] Filed: Dec. 16, 1983

[30] Foreign Application Priority Data

Sep. 26, 1983 [NL] Netherlands ......................... 8303281

[51] Int. Cl.⁴ ................................................. G11B 7/00
[52] U.S. Cl. ....................................... 369/13; 360/59; 360/114

[58] Field of Search .................... 360/59, 114; 369/13; 365/122; 358/342

[56] References Cited

U.S. PATENT DOCUMENTS 4,477,852 10/1984 Ota et al. .............................. 360/114

FOREIGN PATENT DOCUMENTS 133503 8/1982 Japan .................................. 360/114

Primary Examiner—Robert L. Richardson
Attorney, Agent, or Firm—Robert T. Mayer; Algy Tamoshunas

[57] ABSTRACT

The disclosed method for writing information in a magneto-optical record carrier employs two light beams each positioned on one of two tracks on the record carrier. In one track information is recorded by one light beam, while simultaneously the other track is erased by the other light beam. This enables real time information recording.

13 Claims, 6 Drawing Figures

METHOD OF RECORDING INFORMATION IN A MAGNETO-OPTICAL RECORD CARRIER, APPARATUS FOR CARRYING OUT THE METHOD, AND MAGNETO-OPTICAL RECORD CARRIER FOR USE IN AN APPARATUS FOR CARRYING OUT THE METHOD

The invention relates to a method of recording information as a track of magnetized areas in a magneto-optical record carrier. In such a method, the record carrier is exposed to a magnetic field and the information is recorded by means of a light beam which is incident on the record carrier and whose intensity depends on the information to be recorded. The invention also relates to an apparatus for carrying out the method and to a magneto-optical record carrier for use in such apparatus.

A method of the type specified in the opening sentence is described in "Experiments towards an erasable compact disc digital audio system" by K. A. Schouhamer Immink and J. J. M. Braat, preprint no. 1970 (E2) of the 73-rd Convention of the Audio Engineering Socity held at Eindhoven (NL) from Mar. 15-18, 1983.

In accordance with the known method information is recorded in two steps: (a) the direction of the magnetic field is reversed in order to erase a track with a constant power of the light beam (laser beam), and subsequently (b) the original direction of the magnetic field is restored and new information can be recorded in this track.

The known method has the disadvantage that realtime information recording is not possible. It is an object of the invention to provide a method which enables realtime information recording in a magneto-optical record carrier and which can be carried out in a comparatively simple and fairly cheap manner. To this end the method in accordance with the invention is characterized in that two light beams are used. The two beams are positioned adjacent each other at two positions on the record carrier in order to cooperate with two tracks whose centres, viewed in a direction transverse to the tracks, are situated at least substantially a distance n.d from one another, n being an integer and $\geq 1$ and d being the centre-to-centre distance of two adjacent tracks. At the same time that information is written in one position by one light beam, and the other position is erased by the other light beam.

The invention is based on the recognition of the fact that real-time recording by means of the known method requires an apparatus which is capable of effecting an internal frequency doubling and of buffering the incoming information for a time interval which at least corresponds to one revolution period of the record carrier. This means that very intricate electronic circuitry and a large additional memory is required for buffering the information, which is disadvantageous from the point of view of production engineering and cost. By the use of two light beams, in accordance with the invention, it is now possible to simultaneously erase the information in the first position and to record new information in the second position, where the old information has already been erased. The centre-to-centre distance of the two tracks, as already stated, is at least substantially equal to n.d. Preferably, n is selected to be 1. The two positions are then always situated on two adjacent tracks.

The positions may be situated exactly on a line transverse to the tracks. However, alternatively the light beams may be directed so that the two positions are offset from each other by a specific distance in a direction along the tracks. For example, if $n=1$, the positions may be spaced 20 $\mu m$ from each other, the centre-to-centre distance of two adjacent tracks being for example 2 $\mu m$. Preferably, the magnetic field will be oriented in a direction perpendicular to the record carrier, though other directions are not excluded.

It is to be noted that on pages 45 and 46 of "Electronics" of Dec. 29, 1982 a method is described which in principle enables real-time information recording. This method employs a constant light beam which is projected on the record carrier and the information is recorded by modulating the magnetic field in accordance with the write signal. This modulation requires a constant change of direction of the magnetic field, which is a comparatively slow process, thereby limiting the frequency range of this recording process. Moreover, the known method does not utilize two light beams.

The method is further characterized in that for erasing information in consecutive adjacent positions, which positions are situated on a line which extends at least substantially transversely of the direction of movement of the record carrier at these positions and which positions are situated at a distance n.d from one another, the magnetic field direction is reversed continually. This step is applied in order to ensure that during the recording of information in a position which has been erased previously by a magnetic field having a direction perpendicular to the record carrier, the magnetic field is oriented in the opposite direction, so that recording in this position is actually possible. Thus for the recording of information in consecutive adjacent positions, for which the magnetic field direction is reversed continually, a change of polarity occurs in the relationship between the information to be recorded and the magnetization pattern in consecutive adjacent positions.

The method in accordance with the invention may further be characterized in that n is 1 and during a first writing period with a magnetic field in a specific direction, the information is recorded by the first light beam in a first of two adjacent tracks on the record carrier and at the same time the second track is erased by the second light beam. During a second writing period for the same parts of the two tracks and with a magnetic field of opposite direction, information is recorded in the second track by the second light beam and at the same time the first track is erased by the first light beam. These two tracks may be formed for example by the use of a record carrier provided with two adjacent tracks which extend, over the record carrier along a spiral path. However, alternatively it is possible to use a record carrier having only one spiral track, the light beams being shifted over a distance d along the said line after each revolution of the record carrier. It is also possible to employ a record carrier with circular tracks. The light beams must then be shifted by a distance 2d after each revolution of the record carrier.

If in the first recording period information has been recorded in the relevant portion of the first track by means of the first light beam and the relevant portion of the second track has been erased by the second light beam, the two light beams change functions in the second recording period. The first light beam now constitutes the erase beam for erasing the first track while the second light beam records the information in the second track using a magnetic field of opposite direction. This means that in the second recording period again a polarity change occurs in the relationship between the information to be recorded and the magnetization pattern in the second tracks. Stated in other words: the information applied to the second light beam in the second recording period is inverted in comparison with the information applied to the first light beam in the first recording period.

Preferably, the first track is inscribed completely and the second track is erased completely in the first writing period before information is recorded in the second track. It follows from the foregoing that in effect only half the storage capacity of the record carrier can be used for recording information.

Another method in accordance with the invention is characterized in that n is 1, that for a specific direction of the magnetic field information is recorded by the first light beam in a first position on the record carrier and at the same time a second position, which is reached by the first light beam one revolution period later, is erased by the second light beam. One revolution period of the record carrier later, the direction of the magnetic field is reversed, the information is recorded by the first light beam in the second period and at the same time a third position, which is reached one revolution period later by the first light beam, is erased by the second light beam. This method employs a record carrier having only one track which extends over the record carrier along a spiral path or a circular path, a shift over a distance d along the said line being effected after every revolution of the record carrier. The direction of the magnetic field may then be reversed once every revolution period of the record carrier. In that case recording and erasing is effected with the same direction of the magnetic field during one full revolution period of the record carrier. However, alternatively the magnetic field direction may be reversed an odd number of times during one revolution period of the record carrier. In that case sectors of the record carrier are inscribed and erased using a magnetic field of one and the same direction. However, in both cases one light beam is always the write beam and the other light beam is always the erase beam. After every change of the magnetic field the information must be applied to the write beam in inverted form. In this way it is possible to use substantially the entire storage capacity of the record carrier.

An apparatus in accordance with the invention for carrying out the method comprises:
 means for generating an erase signal,
 means for generating a write signal which depends on the information to be recorded,
 means for generating a light beam,
 means for generating a magnetic field,
 positioning means for positioning and focusing a light beam at a position on the record carrier, and
 means for controlling the intensity of a light beam.

In accordance with the invention the beam generating means produces two light beams and the positioning means positions and focuses the two light beams at two positions on the record carrier so as to cooperate with two tracks whose centres are situated at least substantially a distance n.d from one another. The means for controlling the intensity of a light beam controls the intensities of the two light beams in such a manner that the intensity of one light beam is controlled depending on the write signal for recording information on the record carrier in one position and at the same time the intensity of the other light beam is controlled depending on the erase signal, for erasing the other position. The positioning means can position the light beams in such a manner that the two positions are located exactly on said line. As stated in the foregoing, the two positions may also be slightly offset from said line in the direction of movement of the record carrier.

The apparatus may further be characterized in that the means for generating a magnetic field are constructed in a manner such that, for erasing the information in consecutive adjacent positions on the record carrier, which positions are situated at a distance n.d from each other on a line which extends at least substantially transversely of the direction of movement of the record carrier at these positions, the magnetic field direction is reversed continually. Erasing is effected in that the erase beam is always "on". Thus, there are positions on the record carrier which are erased in the case of an upwardly oriented magnetic field, so that these positions are magnetized in the upward direction or are "1". There are also positions which are erased with a downwardly directed magnetic field, so that these positions are magnetized in the downward direction or are "0". For recording information in those positions which are magnetized in the upward direction upon erasure, the magnetic field must be oriented in a downward direction. Recording information in the form of a "0" or "1" then means that the light beam must be switched on, so that the direction of magnetization at this position is reversed, or must remain off, so that the direction of magnetization at this position is maintained. For recording information in those positions which are magnetized in a downward direction upon erasure, the magnetic field must be oriented in the upward direction. Recording information in the form of a "0" or "1" then means that the light beam must remain switched off, so that the direction of magnetization at the position is maintained, or said beam must be on, so that the direction of magnetization at said position can be reversed. It follows from the foregoing that for recording information in these consecutive positions there is a continual change of polarity in the relationship between the information to be recorded and the magnetization pattern in these positions.

As stated in the foregoing, the magnetic field may be reversed once or an odd number of times per revolution of the record carrier.

In the apparatus for carrying out the method for recording information in two adjacent tracks on the record carrier, use is preferably made of a magneto-optical record carrier which is characterized in that the record carrier comprises two adjacent spiral tracks, the pitch of a track being at least substantially equal to twice the centre-to-centre distance of the two tracks.

Figure 3B:
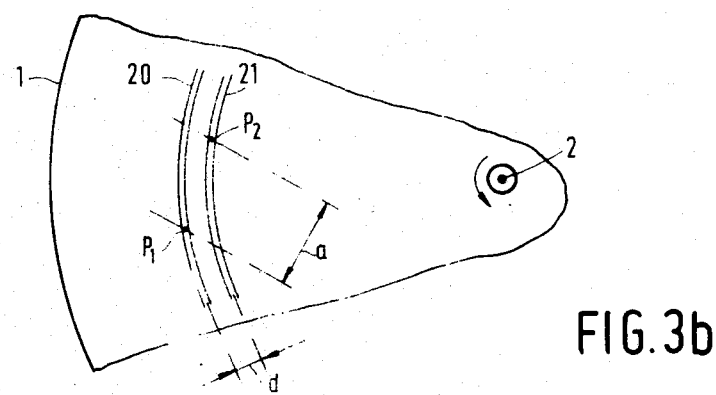
Figure 2:
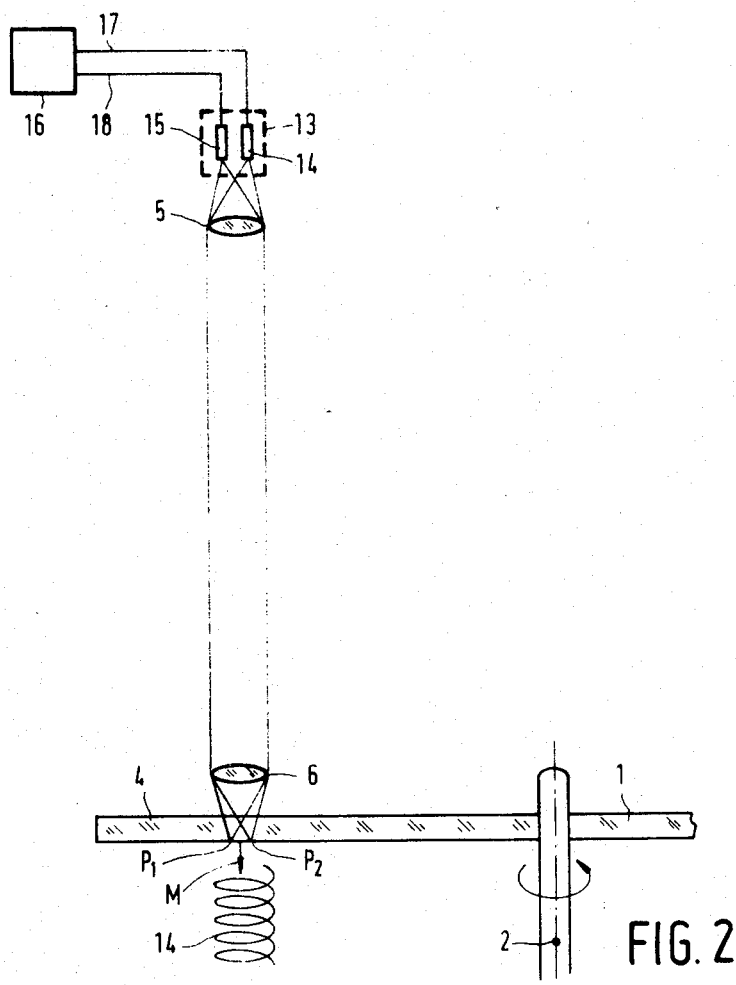
Figure 3A:
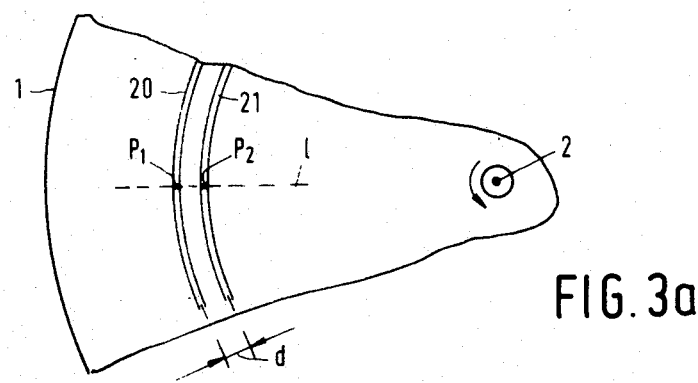

The invention will now be described in more detail by way of example with reference to the drawings, in which identical parts may bear the same reference numerals wherein:

FIG. 1 shows a known apparatus for recording information in a magneto-optical record carrier, FIG. 2 schematically shows an apparatus in accordance with the invention, FIGS. 3a and 3b show two possibilities of positioning the beams at two positions $P_1$ and $P_2$ on two adjacent tracks on a magneto-optical record carrier, FIGS. 4a to 4d, illustrate four stages during erasing and recording of information in one version of the method in accordance with the invention, FIGS. 5a to 5d, illustrate four stages in erasing and recording information in another version of the method in accordance with the invention.

FIG. 1 shows a known apparatus for recording information in a magneto-optical record carrier 1, which in the present case is shown to be rotatable about an axis 2. A laser source 3, forming the means for generating a light beam, is arranged at some distance above the surface 4 of the record carrier 1. The laser source 3 is for example an AlGaAs-diode laser which can emit light waves of a wavelength in the range between 730 and 870 nm. A characteristic wavelength is 780 nm. Such lasers are compact and are suitable for mounting so as to be movable (for example in the radial direction) relative to the record carrier.

A lens system 5, 6 focuses the light from the laser source 1 at position P on the record carrier 1. In the light path there is arranged (at least during the read process) a polarizer 7 as well as a semi-transparent mirror 8 (T=90%) in order to direct a part of the reflected light to a detection device 9 for controlling the correct focusing, and a semi-transparent mirror 10 (T=75%) in order to direct a part of the reflected light to a photoelectric detector 13 (for example a Si-avalanche detector) via an analyser 11 and a lens 12. During the write process the focused radiation from the laser source 3 is employed for heating a selected position on the record carrier 1, which position has been premagnetized (erased) in the direction M', to a temperature in the proximity of its Curie-temperature. This temperature rise together with the energization of the coil 14, which constitutes the means for generating a magnetic field produces a counter field M of the order of 1000 Oe, produces a reversal in the magnetization of the exposed position after cooling.

The relevant position is now magnetized in a downward direction. This corresponds to the recording of, for example, a logic "zero". Recording a logic "one" is achieved by switching off the laser beam. The relevant position now remains magnetized in the upward direction.

If an information carrier 1 which has thus been inscribed is to be re-used the old information must be erased. This is effected by exposing the record carrier to a magnetic field in the direction M' (i.e. in an upward direction) and by magnetizing all positions, if they were not magnetized in the upward direction, in the upward direction by means of the laser beam. Subsequently the record carrier can be used again.

Instead of bulk erasure of the record carrier before it is used again, it is possible to erase a part of the record carrier (for example, all positions which are situated substantially on one revolution curve of the track of the record carrier) during one revolution, to inscribe these positions during the next revolution of the record carrier, to erase the next part (namely, the second revolution curve of the track) during the following revolution and to inscribe this second revolution curve during the next revolution. As already stated in the introductory part, such erase and recording processes cannot be used if real-time information recording is required. The incoming information during erasure of a revolution curve of the track would have to be buffered (stored)— which demands additional storage capacity—and, moreover, frequency doubling would have to be applied, to enable the information received during two revolution periods of the record carrier to be recorded during one revolution period of the record carrier.

Another known method employs the apparatus shown in FIG. 1 as well. Here, information is recorded with a continuously switched-on light beam. The direction of the magnetic field M changes continually depending on the information to be recorded. This method permits real-time recording of information. However, the method has one important restriction. The frequency range and consequently the recording speed are rather limited because of the comparatively long time required for reversing the magnetic field M. A typical maximum value is for example 100 to 200 kHz. This is prohibitive of video applications, because now frequencies as high as 6 to 8 MHz are involved. The known method is also not suitable for use with Compact Discs, because the frequency range then extends up to approximately 2 MHz.

FIG. 2 describes a solution which enables realtime information processing to be achieved without frequency doubling and without buffering and which can also be used at high frequencies.

FIG. 2 very schematically shows an apparatus in accordance with the invention for recording information in the magneto-optical record carrier 1. The means 13 for generating a light beam are now constructed to generate a second light beam. This may be achieved, for example, by providing the means 13 with two laser sources 14 and 15. The positioning means for positioning and focusing a light beam at a position on the record carrier—schematically shown to FIG. 2 by the lens system 5, 6—are adapted in position and focus the two light beams at two adjacent positions $P_1$ and $P_2$ on the record carrier 1 for cooperation with two tracks. The two positions $P_1$ and $P_2$ may be situated on a line which extends at least substantially transversely of the direction of movement of the record carrier at a location of these positions. This means that this line is situated in the plane of the drawing in FIG. 2. The distance between the two positions is at least substantially equal to n.d, n being an integer and $\geq 1$ and d being the centre-to-centre distance of two adjacent tracks. In FIG. 3a this is illustrated for the case where n=1.

Two adjacent tracks on the record carrier are designated 20 and 21. The line 1 is the line which extends transversely of the direction of movement of the record carrier at the location of the positions $P_1$ and $P_2$, which are both situated on this line.

However, it is alternatively possible that the two light beams are slightly offset relative to each other in a direction along the track on the record carrier. This is shown in FIG. 3b. Typical values for the quantities a and d in FIG. 3b are 20 μm and 2 μm, respectively.

The means for controlling the intensity of the light beam is indicated by the reference numeral 16 in FIG. 2. The means 16 comprises means for generating an erase signal and means for generating a write signal depending on the information to be written. The erase signal and the write signal are applied to the laser sources 14 and 15 via the lines 17 and 18 respectively. The means 16 are constructed so as to control one light beam in dependence on the write signal for recording information in one position $P_1$ (or $P_2$) and, at the same time, so as to control the other light beam in dependence on the erase signal for erasing (old information in) the other position $P_2$ (or $P_1$).

Figure 4:
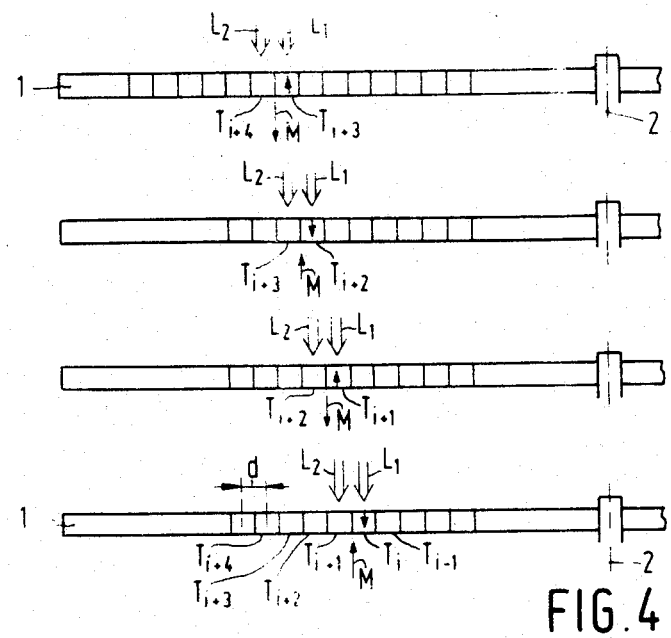

The apparatus shown in FIG. 2 may operate for example as explained with reference to FIG. 4. It is assumed that n=1, so that the two positions $P_1$ and $P_2$ are situated at the distance d from each other on the line perpendicular to the direction of movement of the record carrier at the positions. FIG. 4 shows a record carrier in which one track extends over the record carrier along a spiral path—or along a circular path for which an inward or outward shift over the distance d is effected once per revolution of the record carrier. In FIG. 4a, $L_1$, $L_2$ are the two light beams positioned on two adjacent tracks $T_i$ and $T_{i+1}$ and M is the magnetic field which is oriented upwardly. FIG. 4b shows the situation after one revolution period of the record carrier. The light beams $L_1$ and $L_2$ are now positioned on the adjacent tracks $T_{i+1}$ and $T_{i+2}$ respectively and the direction of the magnetic field M has been reversed. FIGS. 4c and 4d respectively show the situation one and two revolution periods of the record carrier later. Consequently, the light beams travel over the record carrier from the inside towards the outside. This means that $L_2$ must be the erase beam and $L_1$ the write beam. The erase beam is switched on continuously. In the situation illustrated in FIG. 4a the newly recorded information is situated at the positions to the right of $T_i$ (i.e. $T_{i-1}$, $T_{i-2}$ ... etc.). The positions to the left of $T_i$ (i.e. $T_{i+1}$, $T_{i+2}$, ... etc.) contain the old information which is to be erased by the erase beam $L_2$. The old and the new information is contained in the relevant positions in the form of upward or downward magnetizations. Therefore, the boxes corresponding to the positions T are left open. The position $T_i$ has been erased by the erase beam $L_2$ using a downwardly directed magnetic field M one revolution period before the situation of FIG. 4a. The arrow in box $T_i$ thus indicates that this position has been erased by magnetization in a downward direction. In the situation shown in FIG. 4a new information can be recorded in position $T_i$ by the write beam $L_1$ using a magnetic field M in upward direction. If this is a logic "one" the light beam must be switched on, so that the magnetization in position $T_i$ can be reversed. If a logic "zero" is to be written the light beam is extinguished, so that the magnetization in the downward direction is maintained. An open box $T_i$ in FIG. 4b indicates that new information has been recorded. At the same time position $T_{i+1}$ is erased by the erase beam $L_2$ in FIG. 4a. This means that position $T_{i+1}$ is magnetized in an upward direction. This is shown in FIG. 4b. One revolution period later (see FIG. 4b) new information can be recorded in position $T_{i+1}$ by the light beam $L_1$. Since the magnetic field M now has a downward direction, recording a logic "one" and a logic "zero" means that the light beam $L_1$ must be extinguished and on respectively. This is exactly the opposite of the situation in the case of recording in position $T_i$. Owing to the reversal of the magnetic field for consecutive adjacent positions the information to be recorded in these consecutive adjacent positions must therefore be inverted.

It is to be noted that information modulation methods are known in which data and inverted data have the same information content, as for example in the pulse-width modulation used in the Philips Laservision system. The pulse-width modulated signal is then in fact a carrier wave which is frequency-modulated by the video signal. Inversion of the data on the record carrier in that the magnetic field is inverted, without the data applied to the laser modulator 16 being inverted, then only produces a phase shift of 180° in the carrier wave during read-out, which will not disturb the video signal after FM-demodulation.

The alternate reversal of the magnetic field also means that erasing consecutive adjacent positions is also effected in alternately opposite directions. For example, it can be seen in FIG. 4c that position $T_{i+2}$ is erased by $L_2$ (in the situation shown in FIG. 4b) by magnetization in a downward direction. FIG. 4d shows the situation one revolution period later. The position $T_{i+3}$ is now erased by a magnetization in the upward direction and the new information can now be recorded in this position. Simultaneously, position $T_{i+4}$ is erased by magnetization in a downward direction. If the record carrier 1 has thus been filled entirely, it is possible to record new information on the record carrier starting from the inside. It is then necessary to wait one revolution period of the record carrier before making this recording because during this first revolution period erasing is effected by $L_2$ only. The initial orientation of the magnetic field M during the first revolution period is arbitrary and is neither related to the initial orientation nor to the final orientation of the magnetic field during the previous recording process.

As stated in the foregoing the two light beams $L_1$ and $L_2$ may be spaced from each other by a distance greater than one times d. If n is odd and greater than one, the diagram of FIG. 4 may be adhered to, with the proviso that in FIG. 4a (for n=3) the light beam $L_2$ is already directed at position $T_{i+3}$ and the positions $T_i$, $T_{i+1}$ and $T_{i+2}$ have been erased three, two and one revolution period (s) of the record carrier earlier, respectively, by magnetizations in downward, upward and downward directions, respectively. If the distance between the positions is an even multiple of d, for example 2d, the magnetic-field direction may be maintained for a plurality of revolution periods, in the present example two, before it must be reversed. However, in the afore-mentioned cases the magnetic field is continually reversed for erasing these positions which are spaced from each other by a distance nd.

If the two light beams are spaced further apart than one times d, this has the disadvantage that when recording is started it is necessary to erase and consequently wait for two or more revolution periods (depending on the value of n) until recording is possible.

So far, it has been assumed that the magnetic field direction is not reversed for at least one revolution period of the record carrier. This is not necessary. Alternatively, the magnetic field direction may be reversed more than once every revolution period of the record carrier, provided that this is effected an odd number of times per revolution period. If this is necessitated by the method of modulating the information, the information must also be inverted an equal number of times per revolution period.

Figure 5:
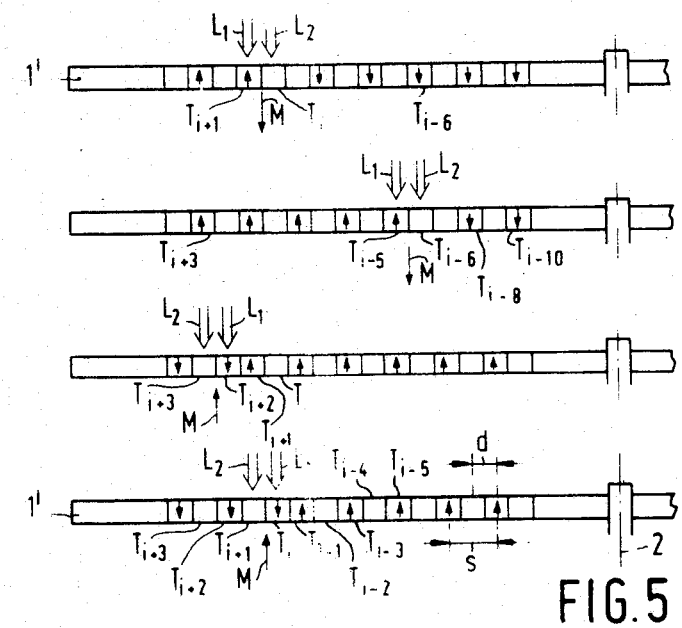

The apparatus shown in FIG. 2 may also operate in a different manner. This will be explained with reference to FIG. 5. Again it is assumed that n=1, so that the two positions $P_1$ and $P_2$ are spaced a distance d from each other. FIG. 5 shows a record carrier 1' on which two adjacent spiral tracks are formed. The pitch S (see FIG. 5a) of a track is at least substantially equal to twice the centre-to-centre distance of the two tracks (i.e. 2d). FIG. 5a shows the two light beams $L_1$, $L_2$ positioned on two adjacent tracks $T_i$ and $T_{i+1}$, M being the upwardly directed magnetic field. FIG. 5b shows the situation one revolution period of the record carrier 1' later. The light beams $L_1$ and $L_2$ are now positioned at positions $T_{i+2}$ and $T_{i+3}$ respectively. The magnetic field M still has the same direction. Again the light beams travel over the record carrier from the inside towards the outside. $L_2$ is the erase beam and $L_1$ is the write beam.

The erase beam $L_2$ is switched on continuously. In this situation one track is erased and in the other track new information is recorded with the magnetic field M having an upward direction. One track is erased by the magnetization in the upward direction. In FIGS. 5a and 5b this can be seen in that all positions $T_{i-1}$, $T_{i-3}$, $T_{i-5}$ ... etc., corresponding to said one track, are magnetized in the upward direction. The intermediate positions $T_{i-2}$, $T_{i-4}$ ... etc., which corresponds to the second track, contain newly recorded information. Therefore the boxes corresponding to these positions T have been left open. The positions $T_{i+1}$, $T_{i+3}$ ..., corresponding to said first track are positions to be erased. The positions $T_i$, $T_{i+2}$, $T_{i+4}$, ..., corresponding to said second track, are previously erased positions with a magnetization in the downward direction, in which new information is to be recorded. In the situation shown in FIG. 5a new information can be recorded in position $T_i$ by the write beam $L_1$. If this is again a logic "one" the light beam must be switched on so that the magnetization in position $T_i$ can be reversed. If a logic "zero" is to be written, the light beam is extinguished, so that the magnetization in the downward direction is maintained. In FIG. 5b the open box $T_i$ indicates that the new information has been recorded. Simultaneously, position $T_{1+1}$ is erased by light beam $L_2$ in FIG. 5a. This means that position $T_{i+1}$ is magnetized in the upward direction, as is indicated in FIG. 5b.

One revolution period later (see FIG. 5b) the new information can be recorded by the light beam $L_1$ in position $T_{i+2}$. Since the magnetic field M is now also upwardly directed no inversion is required for recording the information. The simultaneous erasure of position $T_{i+3}$ means that the magnetization also has the upward direction (see FIG. 5c). If said second track of the record carrier 1' has thus been inscribed completely new information may be recorded on the record carrier but now in said first track, starting from the inside. This is illustrated by FIGS. 5c and 5d. The light beams are now interchanged. This means that now the light beam $L_1$ is the write beam and the light beam $L_2$ is the erase beam. The same pairs of positions ... ; $T_{i-2}$, $T_{i-1}$; $T_i$, $T_{i+1}$; $T_{i+2}$, $T_{i+3}$; ... are again scanned simultaneously by the two light beams. The magnetic field M has now been reversed and this direction is maintained during the entire recording of new information in the first track. In the situation shown in FIG. 5c new information is recorded in position $T_{i-5}$ by the light beam $L_1$. If this be a logic "one" the light beam must be extinguished, so that the magnetization in the upward direction in position $T_{i-5}$ is maintained. If a logic "zero" is to be recorded the light beam $L_1$ must be switched on, so that the magnetization in position $T_{i-5}$ can be reversed. Thus, for recording information in the first track the information must be applied in inverted form compared with the recording of information in the second track, unless the information is again modulated symmetrically. The position $T_{i-6}$ is erased by the light beam $L_2$ in the same way as happened one and two revolution periods of the record carrier earlier for the positions $T_{i-8}$ and $T_{i-10}$. In FIG. 5d this erasure is indicated by the downward magnetization of the position $T_{i-6}$.

Three revolution periods later the situation of FIG. 5d is obtained. Now the same positions as in the situation shown in FIG. 5a, namely positions $T_i$ and $T_{i+1}$, will be processed. The new information is recorded in position $T_{i+1}$, which has been erased previously by a magnetization in the upward direction, whilst position $T_i$ is erased by a magnetization in downward direction. FIGS. 5c and 5d clearly show that corresponding to positions $T_{i-5}$, $T_{i-3}$, $T_{i-1}$, $T_{i+1}$, see FIG. 5c, the new information is recorded in the previously erased first track, whilst the second track (corresponding to positions $T_{i-10}$, $T_{i-8}$, $T_{i-6}$, $T_{i-4}$, $T_{i-2}$, see FIG. 5d) is erased by a magnetization in downward direction. This means that in effect only half the storage capacity of the information carrier is utilized. Each time that one of the tracks is inscribed and the other is erased the magnetic field direction is reversed for writing and erasing the other and the one track respectively. Nevertheless, the magnetic field is reversed continually for erasing those positions which are spaced a distance d from each other. For the description with reference to FIG. 5 it is assumed that the record carrier comprises two adjacent spiral tracks. This is not necessarily so. Alternatively, a record carrier may be used which comprises one spiral track, a jump by a distance d in a direction transverse to the track being effected every revolution of the recrod carrier, or use is made of a record carrier with circular tracks. In the last-mentioned case a jump by 2d in a direction transverse to the tracks must be effected every revolution.

Neither is it necessary that one track is filled completely before a recording in the other track is started. As long as a part on the record carrier is available where at least a part of one of the two tracks has been erased, information may be recorded in that part. Simultaneously another part of the track is then erased.

What is claimed is:

1. A method of recording information in a plurality of generally parallel, elongated tracks on a magneto-optical record carrier, said method comprising the steps of exposing the record carrier to a magnetic field of a predetermined direction, directing two light beams at two locations on the record carrier which are spaced from each other in a direction transverse to the track direction by a distance substantially equal to n.d, where n is an integer equal to or greater than one and d is the distance between centers of two adjacent tracks, so that each beam is incident on a respective one of two tracks, producing relative movement between said beams and said record carrier so that each of said beams travels along a respective one of said tracks, with one of said beams erasing information previously recorded in the track associated therewith, and at the same time that said previously recorded information is being erased, recording information in the other track of said two tracks with the other of said beams.

2. The method as claimed in claim 1 wherein the direction of said field is the same at each of said two locations at which the respective beam is incident on the record carrier.

3. A method as claimed in claim 1 or 2 wherein after the information is recorded in and erased from at least a first portion of the respective one of said two tracks by the associated beam, said beams are moved relative to the record carrier transversely to the track direction by a distance such that said light beams are incident on another pair of tracks which are spaced from each other by said distance n.d, repeating said erasing and recording steps so that one of said beams records information in a second portion of one track of said another pair which had previously been erased, and the other of said light beams erases a second portion of the other track of said another pair, and reversing the direction of said magnetic field so that during recording of information in and erasing of information from said second portions, the direction of said field is opposite to said predetermined direction that the magnetic field had when the information was recorded in and erased from said first portions.

4. A method as claimed in claim 3 wherein said information being recorded is digital data comprised of ones and zeroes, and including the step of inverting said information so that the information recorded in said second portion is inverted with respect to the information recorded in said first portion.

5. A method as claimed in claim 1 or 2 wherein n is equal to 1 and wherein during a first writing period, with said magnetic field in said predetermined direction, information is erased by said one light beam from at least a portion of one of two adjacent tracks and at the same time information is recorded in at least a portion of the second track of said two adjacent tracks by said other light beam, and during a second writing period, the direction of said magnetic field is reversed, information is recorded by said one beam in said portion of said one track which was erased during said first periods and information previously recorded in said portion of said second track is erased by said other light beam.

6. A method as claimed in claim 5 wherein said one track and said second track each defines one of a pair of adjacent spirals on said record carrier.

7. A method as claimed in claim 6 wherein information is recorded along the full length of said during track and the full length of said one track is erased during said first writing period.

8. A method as claimed in claim 1 or 2 wherein said record carrier is a disc, said tracks are circular and extend about a center of rotation of said disc, n is equal to one, and wherein during one revolution of said disc and with said field in said predetermined direction, said one beam erases at least a portion of said one track which extends about said center of rotation and during the next revolution of said disc, the direction of said field is reversed and said other beam records information in said portion of said one track which was erased by said one beam during the previous revolution of said disc.

9. The method as claimed in claim 8 wherein said direction of said field is reversed an odd number of times during one revolution of said disc.

10. The method as claimed in claim 1 or 2 wherein n is equal to one.

11. An apparatus for recording information in a plurality of generally parallel, elongated tracks on a magneto-optical record carrier, said apparatus comprising means for generating an erase signal, means for generating a write signal which depends on the information to be recorded, means for generating a pair of light beams, means for producing relative movement between said beams and said record carrier, means for positioning and focusing said light beams so that each beam of said pair is incident on said record carrier at one of two positions which are spaced from each other by a distance n.d, where d is the distance between the centers of two adjacent tracks and n is an integer equal to or greater than one, so that upon said relative movement each beam moves along one of two tracks, means for producing a magnetic field of a predetermined direction at least at said positions at which said beams are incident on said record carrier, and means responsive to said erase and write signals for controlling the intensities of said beams such that, in dependence on said write signal, one of said beams records information in one of said two tracks as magnetized areas disposed along said one track and, in dependence on said erase signal, the other of said two tracks is erased by the other of said two beams.

12. The apparatus according to claim 11 wherein said record carrier is a disc and said producing means includes means for rotating said disc about an axis of rotation, and wherein said tracks are circular and extend about said axis.

13. The apparatus according to claim 12 wherein said circular tracks form turns of two adjacent multi-turn spirals having a pitch substantially equal to twice the center-to-center distance between said adjacent spirals.

* * * * *

UNITED STATES PATENT AND TRADEMARK OFFICE
CERTIFICATE OF CORRECTION

PATENT NO. : 4,630,249
DATED : December 16, 1986
INVENTOR(S) : Josephus J.M. Braat et al It is certified that error appears in the above-identified patent and that said Letters Patent is hereby corrected as shown below:

<u>IN THE CLAIMS</u>

Claim 7, line 2    change "during" to --second--

Signed and Sealed this

Twenty-seventh Day of September, 1988

Attest:

DONALD J. QUIGG

*Attesting Officer*    *Commissioner of Patents and Trademarks*